Nov. 16, 1926.   1,607,489

F. S. SPRINGSTEAD

PROTECTOR FOR WINDSHIELDS

Filed Dec. 17. 1923

INVENTOR
Franklin S. Springstead
BY
Frank Keizer
ATTORNEY

Patented Nov. 16, 1926.

1,607,489

UNITED STATES PATENT OFFICE.

FRANKLIN S. SPRINGSTEAD, OF ROCHESTER, NEW YORK.

PROTECTOR FOR WINDSHIELDS.

Application filed December 17, 1923. Serial No. 681,114.

The object of this invention is to provide a protector for automobile windshields that will efficiently keep the windshield clear from rain, snow, insects, etc.

Another object of the invention is to so construct the protector that it will protect the eyes of the driver of the car against the glare from the sunlight or the headlights of approaching cars.

These and other objects of this invention will be fully illustrated in the drawing, described in the specification and pointed out in the claims at the end thereof.

In the accompanying drawing.

In the figures of the drawing like reference numerals indicate like parts.

The combination windshield protector and antiglare shield forming the subject matter of my present invention is especially adapted to keep the upper portion of the windshield clear from any matter that will obstruct the vision of the driver or in fact of any one riding in the car and looking through the windshield. It is provided with a sight opening in line with the vision of the driver that cannot be closed or even partially closed or in any way obliterated so that a clear vision through it is assured.

Figure 1:
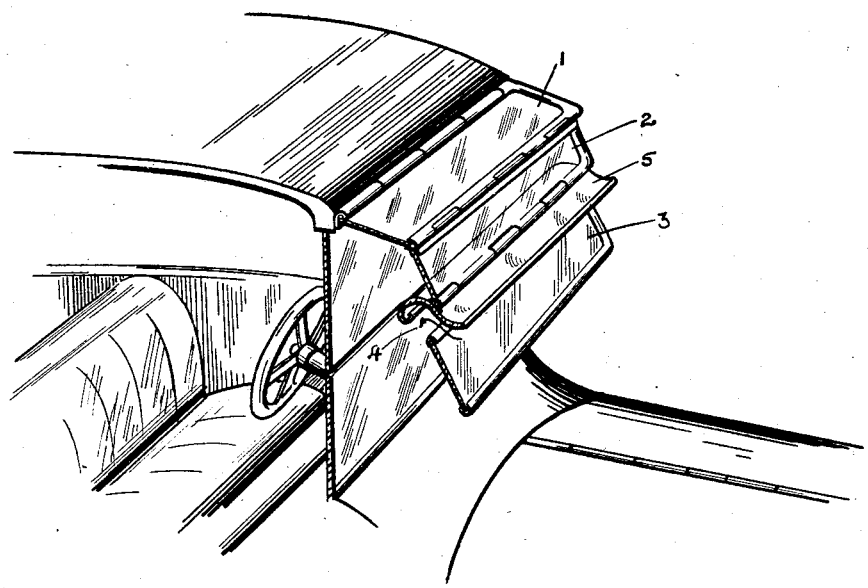
Figure 1 is a perspective and partial sectional view of the front portion of an automobile showing the windshield protector in place on the windshield.

As illustrated in the figures of the drawing the protector is built up in the form of a visor comprising a slightly downwardly inclined top section 1, and two inclined front sections 2 and 3. The two inclined sections are mounted between the standards 2<sup>A</sup> which form part of the supporting frame of the protector, as will presently appear. An opening 4 is left free between the inclined front sections 2 and 3 and a curved deflecting plate in section 5 is suitably suspended from the section 2 so as to project to either side of the opening 4 as illustrated in Figure 1. All of the sections of the protector are connected to each other and are adjustable so that their relative positions can be changed. Thus the top section 1 is preferably hinged to the top of the windshield or body of the car and can be inclined to suit the driver. This top section is preferably made translucent or at least opaque so that the eyes of the driver are protected against the glare from the sunlight. A colored glass or celluloid shield with a suitable frame surrounding it can therefore be used for this section. The upper front section 2 of the protector in turn is hinged to the end of the top section or visor 1 and is preferably made transparent. At the lower end of the transparent section 2 is mounted the reversely curved shield 5 which is also preferably transparent but is so hinged to the standards 2<sup>A</sup> along the middle thereof that it can be swung into any suitable angular position with relation to the shield section 2 and the shield section 3.

Figure 2:
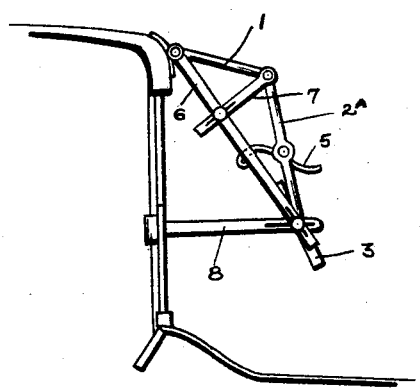
Figure 2 is a side elevation of the portion of the automobile and windshield protector mounted thereon illustrated in Figure 1.

The shield section 3 is mounted below the section 2 and is independently adjustable between the standards 2<sup>A</sup> into the proper angular position with relation to the shield section 2 and its curved deflecting section 5. All of the sections are supported from the body or the windshield frame of the car as illustrated in Figure 2. For this purpose the angular braces 6 and 7 and the horizontal brace 8 are provided at the ends of the sections. These braces connect the jointed ends of the sections 1, and standards 2<sup>A</sup> with each other and support them on the car. The braces are hinged at the ends and have sliding engagement with each other that permits an angular adjustment of the sections of the protector with relation to each other and the windshield of the car.

As will be seen from an inspection of Figure 1, the section 5 of the protector is adjusted and arranged in front of the windshield so that all of the upper portion of the windshield except a narrow strip located behind the sight opening 4 is covered by the shield sections of the protector. As above pointed out the top or visor section 1 slightly tilts down while the section 2 carried on the end of the visor section inclines forwardly. The lower section 3 in turn is inclined more than the section 2 and in fact is so adjusted with relation to the curved deflecting section 5 that a current of air against the protector is deflected into the sight opening between the sections 2 and 3 and against the curved inner end of the deflecting section 5. The deflecting section in turn deflects the current of air down in front of the windshield. In this way the air current entering the sight opening of the protector between the sections 2 and 3 thereof is deflected from the windshield behind the protector and any rain drops, snowflakes or insects are carried with it and drop on to the hood of the engine or cowl of the car without obstructing the vision of the driver through the windshield and the sight opening of the protector.

I claim:

1. A windshield protector comprising a visor section, a transparent shield section suspended from the free end of said visor section, a second transparent shield section mounted below said first shield section with a sight opening between them, means for angularly adjusting said second transparent shield section with relation to the sight opening between said first and said second shield section, a curved deflecting plate suspended in said sight opening and projecting forwardly and rearwardly of said sight opening to deflect the air passing through said sight opening downwardly in back of said second shield section.

2. A windshield protector comprising a visor, a shield mounted below said visor comprising an upper and a lower section with a sight opening between said sections, a deflecting plate mounted in said sight opening and adapted to deflect the air rushing thru said sight opening downwardly.

3. A windshield protector comprising a visor, a shield mounted below said visor, comprising an upper and a lower section with a sight opening between them, a deflector mounted in said sight opening and projecting forwardly and rearwardly thereof, and adapted to be angularly adjusted therein, said deflector plate being adapted to deflect the current of air passing thru the sight opening so that it will not strike the windshield of the car in front of which said visor and said shield is mounted.

In testimony whereof I affix my signature.

FRANKLIN S. SPRINGSTEAD.